US012652130B2

(12) United States Patent
Wu

(10) Patent No.: US 12,652,130 B2
(45) Date of Patent: Jun. 9, 2026

(54) HARQ-ACK CODEBOOK FEEDBACK METHOD AND TERMINAL DEVICE

(71) Applicant: GUANGDONG OPPO MOBILE TELECOMMUNICATIONS CORP., LTD., Dongguan (CN)

(72) Inventor: Zuomin Wu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 535 days.

(21) Appl. No.: 18/071,101

(22) Filed: Nov. 29, 2022

(65) Prior Publication Data

US 2023/0094711 A1 Mar. 30, 2023

Related U.S. Application Data

(63) Continuation of application No. PCT/CN2020/093372, filed on May 29, 2020.

(51) Int. Cl.
*H04L 1/1812* (2023.01)
*H04L 1/1607* (2023.01)
(Continued)

(52) U.S. Cl.
CPC .......... *H04L 1/1812* (2013.01); *H04L 1/1671* (2013.01); *H04L 5/0055* (2013.01); *H04W 72/25* (2023.01)

(58) Field of Classification Search
CPC .... H04W 72/25; H04L 1/1671; H04L 1/1812; H04L 1/1822; H04L 1/1854;
(Continued)

(56) References Cited

U.S. PATENT DOCUMENTS

2020/0305126 A1* 9/2020 Li ........................ H04L 1/1614
2021/0050950 A1* 2/2021 Zhou .................... H04L 1/1861
(Continued)

FOREIGN PATENT DOCUMENTS

CN 109639398 A 4/2019
CN 110381599 A 10/2019
(Continued)

OTHER PUBLICATIONS

International Search Report and Written Opinion dated Feb. 20, 2021 in International Application No. PCT/CN2020/093372. English translation attached.
(Continued)

*Primary Examiner* — John Pezzlo
*Assistant Examiner* — Abdul Aziz Santarisi
(74) *Attorney, Agent, or Firm* — Sheppard, Mullin, Richter & Hampton LLP

(57) ABSTRACT

Provided is a HARQ-ACK codebook feedback method, which includes: receiving, by a first terminal device, a first SCI format transmitted by a second terminal device, the first SCI format indicating to receive a first PSSCH based on a first HARQ process number, the first PSSCH corresponding to a first feedback bit, and the first SCI format including first ID indication information corresponding to the first terminal device and second ID indication information corresponding to the second terminal device; and generating, by the first terminal device, a first HARQ-ACK codebook based on the first ID indication information and/or the second ID indication information. The first HARQ-ACK codebook includes feedback bits for all HARQ processes that are sorted based on HARQ process numbers, and the first feedback bit has a position in the first HARQ-ACK codebook that is determined based on the first HARQ process number.

11 Claims, 4 Drawing Sheets

<u>200</u>

(51) Int. Cl.

| | | |
|---|---|---|
| *H04L 5/00* | (2006.01) | |
| *H04W 72/25* | (2023.01) | |

(58) Field of Classification Search
CPC ... H04L 1/1861; H04L 1/1887; H04L 5/0053; H04L 5/0055
USPC .......................................................... 370/329
See application file for complete search history.

(56) References Cited

U.S. PATENT DOCUMENTS

| | | | | |
|---|---|---|---|---|
| 2021/0168776 | A1* | 6/2021 | Li | H04W 74/0808 |
| 2021/0288778 | A1* | 9/2021 | Park | H04L 1/1812 |
| 2021/0377912 | A1* | 12/2021 | El Hamss | H04L 1/1861 |
| 2022/0060286 | A1* | 2/2022 | Yoshioka | H04L 1/1854 |
| 2022/0182192 | A1* | 6/2022 | Lee | H04W 92/18 |
| 2022/0191725 | A1* | 6/2022 | Ashraf | H04L 1/1825 |

FOREIGN PATENT DOCUMENTS

| | | |
|---|---|---|
| CN | 111132329 A | 5/2020 |
| CN | 111148077 A | 5/2020 |
| WO | 2020068973 A1 | 4/2020 |

OTHER PUBLICATIONS

Fujistu. "Considerations on HARQ-ACK Feedback for NR-V2X Unicast", 3GPP TSG RAN WG1 Meeting #95 R1-1812411, Nov. 2, 2018 (Nov. 2, 2018), entire document.

Extended European Search Report dated Jun. 6, 2023 received in European Patent Application No. EP20938455.1.

AT&T et al: "RAN1 UE features list for Rel-16 NR after RAN1#100bis-E"3GPP Draft; R1-2003072.ZIP R1-2003073, 3rd Generation Partnership Project (3GPP Mobile Competence Centre ; 650, Route Des Lucioles ; F-06921 Sophia-Antipolis Cedex) Francevol. RAN WG1, No. e-Meeting; Apr. 20, 2020-Apr. 30, 2020, May 11, 2020 (May 11, 2020), XP051883031, 50 pages.

Huawei et al: "sidelink physical layer procedures for NR V2X"3GPP Draft; R1-1910059, 3rd Generation Partnership Project (3GPP Mobile Competence Centre ; 650, Route Des Lucioles; F-06921 Sophia-Antipolis Cedex, France vol. RAN WGI, no. Chongqing, China; Oct. 14, 2019-Oct. 20, 2019, Oct. 8, 2019 (Oct. 8, 2019), XP051809069, 30 pages.

* cited by examiner

<u>200</u>

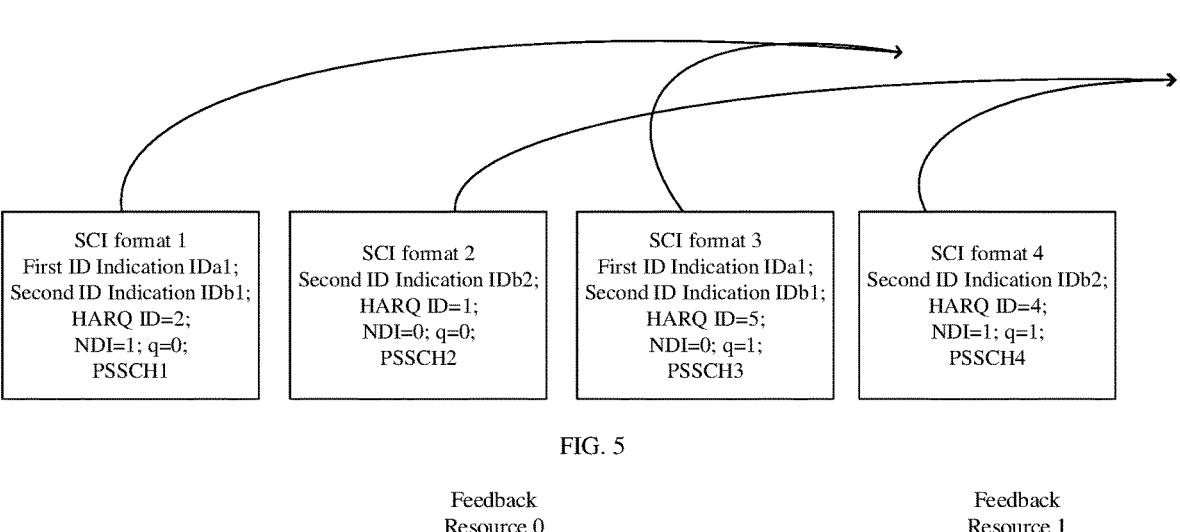
FIG. 5
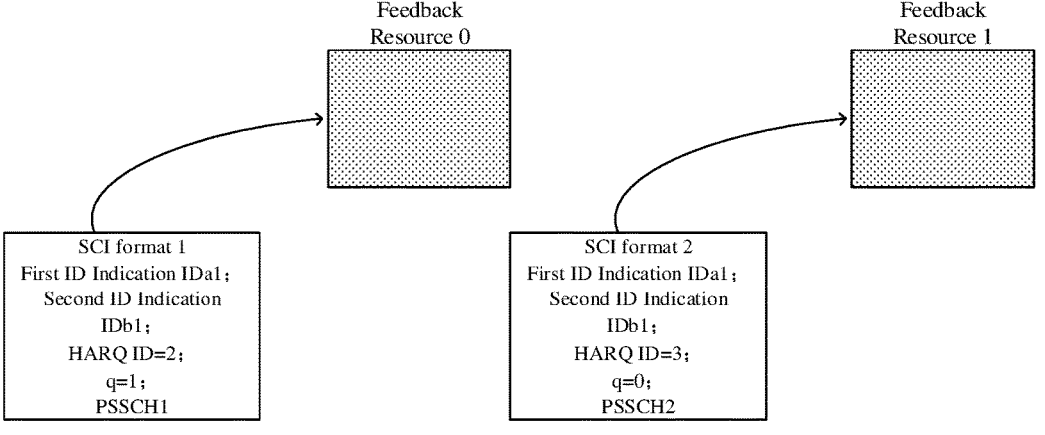
FIG. 6
FIG. 7

Terminal Device 300

Communication Unit 310

Processing Unit 320

Terminal Device 400

Communication Unit 410

Communication Device 500

Memory 520

Processor 510

Transceiver 530

Apparatus 600

Input Interface 630

Processor 610

Memory 620

Output Interface 640

Communication System 700

First Terminal Device

710

Second Terminal Device

720

HARQ-ACK CODEBOOK FEEDBACK METHOD AND TERMINAL DEVICE

CROSS-REFERENCE TO RELATED APPLICATIONS

The present application is a continuation of International Application No. PCT/CN2020/093372, filed on May 29, 2020, the entire disclosure of which is incorporated herein by reference.

TECHNICAL FIELD

The embodiments of the present disclosure relate to communication technology, and more particularly, to HARQ-ACK codebook feedback method and a terminal device.

BACKGROUND

In the sidelink-based access to unlicensed spectrum (SL-U) system, the spectrum used is a shared spectrum. In the Hybrid Automatic Repeat reQuest Acknowledgement (HARQ-ACK) feedback process, since the terminal device needs to transmit a PSFCH after the LBT succeeds, if the LBT fails, the terminal device cannot transmit the PSFCH. Therefore, the HARQ-ACK feedback method in the sidelink (SL) system cannot satisfy the requirements of the SL-U system, which affects the communication of the SL-U system on the shared spectrum.

SUMMARY

The embodiments of the present disclosure provide a HARQ-ACK codebook feedback method and a terminal device, which can support HARQ-ACK feedback in an SL-U system.

In a first aspect, a HARQ-ACK codebook feedback method is provided. The method includes: receiving, by a first terminal device, a first SCI format transmitted by a second terminal device, the first SCI format indicating to receive a first PSSCH based on a first HARQ process number, the first PSSCH corresponding to a first feedback bit, and the first SCI format including first ID indication information corresponding to the first terminal device and second ID indication information corresponding to the second terminal device; and generating, by the first terminal device, a first HARQ-ACK codebook based on the first ID indication information and/or the second ID indication information, where the first HARQ-ACK codebook includes feedback bits for all HARQ processes that are sorted based on HARQ process numbers, and the first feedback bit has a position in the first HARQ-ACK codebook that is determined based on the first HARQ process number.

Optionally, the method may be applied in an SL-U system.

In a second aspect, a HARQ-ACK codebook feedback method is provided. The method includes: transmitting, by a second terminal device, a first SCI format to a first terminal device, the first SCI format indicating to receive a first PSSCH based on a first HARQ process number, the first PSSCH corresponding to a first feedback bit, and the first SCI format including first ID indication information corresponding to the first terminal device and second ID indication information corresponding to the second terminal device; and receiving, by the second terminal device, a first HARQ-ACK codebook transmitted by the first terminal device, where the first HARQ-ACK codebook is generated by the first terminal device based on the first ID indication information and/or the second ID indication information, the first HARQ-ACK codebook includes feedback bits for all HARQ processes that are sorted based on HARQ process numbers, and the first feedback bit has a position in the first HARQ-ACK codebook that is determined based on the first HARQ process number.

Optionally, the method may be applied in an SL-U system.

In a third aspect, a terminal device is provided. The terminal device is configured to perform the method according to the above first aspect or any implementation thereof as performed by the first terminal device.

In particular, the terminal device includes one or more functional modules configured to perform the method according to the above first aspect or any implementation thereof.

In a fourth aspect, a terminal device is provided. The terminal device is configured to perform the method according to the above second aspect or any implementation thereof as performed by the second terminal device.

In particular, the terminal device includes one or more functional modules configured to perform the method according to the above second aspect or any implementation thereof.

In a fifth aspect, a terminal device is provided. The terminal device includes a processor and a memory. The memory stores a computer program, and the processor is configured to invoke and execute the computer program stored in the memory to perform the method according to the above first aspect or any implementation thereof as performed by the first terminal device.

In a sixth aspect, a terminal device is provided. The terminal device includes a processor and a memory. The memory stores a computer program, and the processor is configured to invoke and execute the computer program stored in the memory to perform the method according to the above second aspect or any implementation thereof as performed by the second terminal device.

In a seventh aspect, an apparatus is provided. The apparatus is configured to perform the method according to the above first or second aspect or any implementation thereof.

In particular, the apparatus includes a processor configured to invoke and execute a computer program from a memory, to cause a device provided with the apparatus to perform the method according to the above first or second aspect or any implementation thereof.

In an eighth aspect, a computer-readable storage medium is provided. The computer-readable storage medium stores a computer program that causes a computer to perform the method according to the above first or second aspect or any implementation thereof.

In a ninth aspect, a computer program product is provided. The computer program product includes computer program instructions that cause a computer to perform the method according to the above first or second aspect or any implementation thereof.

In a tenth aspect, a computer program is provided. The computer program, when executed on a computer, causes the computer to perform the method according to the above first or second aspect or any implementation thereof.

With the above technical solutions, one-shot HARQ-ACK codebook feedback and HARQ-ACK retransmission in the SL-U system can be supported, and the communication of the SL-U system on the shared spectrum can be optimized.

BRIEF DESCRIPTION OF THE DRAWINGS

FIG. 5 is a schematic diagram showing a HARQ-ACK codebook feedback according to another embodiment of the present disclosure.

FIG. 6 is a schematic diagram showing a HARQ-ACK codebook feedback according to yet another embodiment of the present disclosure.

FIG. 7 is a schematic diagram showing a HARQ-ACK codebook feedback according to still another embodiment of the present disclosure.

DETAILED DESCRIPTION

Figures 1, 2:
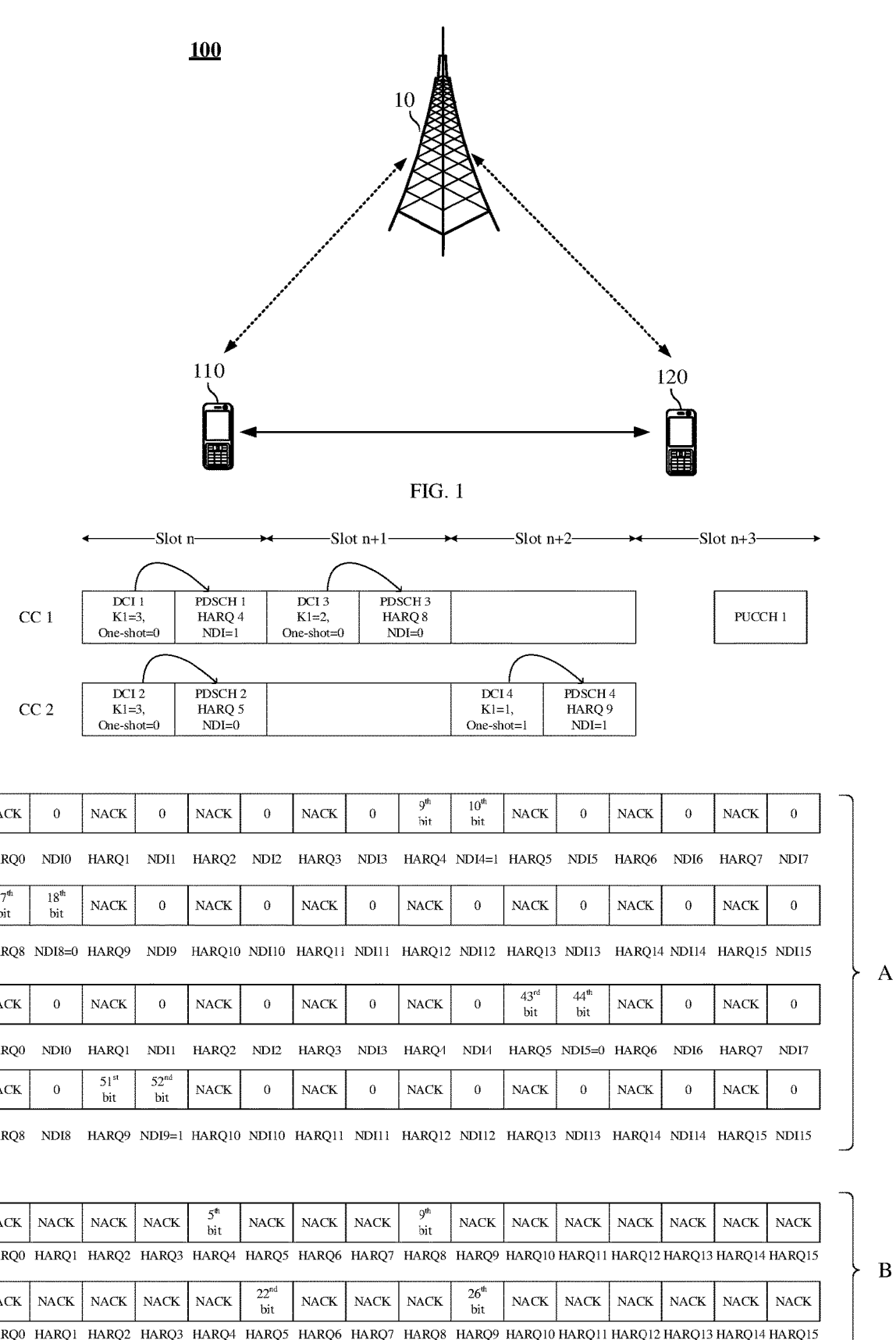
FIG. 1 is a schematic diagram showing a communication system architecture according to an embodiment of the present disclosure.
FIG. 2 is a schematic diagram showing Type 1 and Type 2 one-shot HARQ-ACK feedback according to an embodiment of the present disclosure.

The technical solutions in the embodiments of the present disclosure will be described below with reference to the figure in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The solutions according to the embodiments of the present disclosure can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Non-Terrestrial Network (NTN) system, Universal Mobile Telecommunication System (UMTS), Wireless Local Area Networks (WLAN), Wireless Fidelity (WiFi), the $5^{th}$ Generation (5G) system, or other communication systems.

Generally, traditional communication systems can support a limited number of connections and are easy to implement. However, with the development of communication technology, mobile communication systems will support not only traditional communication, but also e.g., Device to Device (D2D) communication, Machine to Machine (M2M) communication, and Machine Type Communication (MTC), Vehicle to Vehicle (V2V) communication, Vehicle to everything (V2X) communication, etc. The embodiments of the present disclosure can also be applied to these communication systems.

Optionally, the communication system of an embodiment of the present disclosure may be applied to a Carrier Aggregation (CA) scenario, a Dual Connectivity (DC) scenario, a Standalone (SA) network deployment scenario, and the like.

Optionally, the communication system of an embodiment of the present disclosure may be applied to unlicensed spectrum or shared spectrum. Alternatively, the communication system of an embodiment of the present disclosure may be applied to licensed spectrum or non-shared spectrum.

The embodiments of the present disclosure are described in conjunction with a network device and a terminal device. The terminal device may refer to a User Equipment (UE), an access terminal, a user unit, a user station, a mobile station, a remote station, a remote terminal, a mobile device, a user terminal, a terminal, a wireless communication device, a user agent, or a user device. The terminal device may be a station (ST) in a WLAN, a cellular phone, a cordless phone, a Session Initiation Protocol (SIP) phone, a Wireless Local Loop (WLL) station, a Personal Digital Assistant (PDA) device, a handheld device or a computing device having a wireless communication function, another processing device connected to a wireless modem, a vehicle-mounted device, a wearable device, a terminal device in the next generation communication system (e.g., NR network), or a terminal device in a future evolved Public Land Mobile Network (PLMN), etc.

In the embodiments of the present disclosure, the terminal device can be deployed on land, including indoor or outdoor, handheld, worn, or vehicle-mounted, deployed on water (e.g., on a ship), or deployed in the air (e.g., on an airplane, a balloon, a satellite, etc.).

In the embodiments of the present disclosure, the terminal device may be a mobile phone, a tablet computer (Pad), a computer with a wireless transceiver function, a Virtual Reality (VR) terminal device, an Augmented Reality (AR) terminal device, a wireless terminal in industrial control, a wireless terminal device in self driving, a wireless terminal device in remote medical, a wireless terminal device in smart grid, a wireless terminal device in transportation safety, a wireless terminal device in smart city, or a wireless terminal device in smart home.

As non-limiting examples, in an embodiment of the present disclosure, the terminal device may also be a wearable device. The wearable device, also known as wearable smart device, is a general term for wearable devices that are intelligently designed and developed from everyday wear, such as glasses, gloves, watches, clothes, and shoes, by applying wearable technologies. A wearable device is a portable device that can be directly worn on or integrated into a user's clothes or accessories. A wearable device is not only a kind of hardware device, but can also provide powerful functions based on software support, data interaction, and cloud interaction. In a broad sense, wearable smart devices may include full-featured, large-sized devices that can provide full or partial functions without relying on smart phones, such as smart watches or smart glasses, and devices that only focus on a certain type of application function and need to cooperate with other devices such as smart phones for use, such as various smart bracelets and smart jewelries for physical sign monitoring.

In an embodiment of the present disclosure, the network device may be a device communicating with mobile devices. The network device may be an Access Point (AP) in a WLAN, a base station such as Base Transceiver Station (BTS) in a GSM system or a CDMA system, a base station such as NodeB (NB) in a WCDMA system, a base station such as Evolutional Node (eNB or eNodeB) in an LTE system, or a relay station, an access point, a vehicle-mounted device, a wearable device, a network device or base station (e.g., gNB) in an NR network, a network device in a future evolved PLMN, or a network device in an NTN.

As a non-limiting example, in an embodiment of the present disclosure, the network device may have mobile characteristics, e.g., the network device may be a mobile device. Optionally, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, etc. Optionally, the network device may also be a base station provided in a location such as land or water.

In the embodiment of the present disclosure, the network device may provide services for a cell, and the terminal device may communicate with the network device over transmission resources, e.g., frequency domain resources or frequency spectral resources, used in the cell. The cell may be a cell corresponding to the network device (e.g., base station). The cell may belong to a macro base station or a base station corresponding to a small cell. The small cell here may include a metro cell, a micro cell, a pico cell, a femto cell, or the like. These small cells have characteristics such as small coverage and low transmission power, and are suitable for providing high-rate data transmission services.

Exemplarily, a communication system 100 in which an embodiment of the present disclosure can be applied is schematically shown in FIG. 1. The communication system 100 may include a first terminal device 110 and a second terminal device 120. The first terminal device 110 and/or the second terminal device 120 can establish a communication connection with the network device 10. Alternatively, the first terminal device 110 can establish a communication connection with the second terminal device 120. The network device 10 may provide communication coverage for a particular geographic area, and may communicate with terminal devices located within the coverage.

Optionally, the communication system 100 may include more terminal devices. The communication system 100 may include multiple network devices, and the coverage of each network device may include other numbers of terminal devices. The embodiment of the present disclosure is not limited to this.

Optionally, the communication system 100 may also include other network entities such as a network controller or a Mobility Management Entity (MME). The embodiment of the present disclosure is not limited to this.

Exemplarily, the communication system applied in the embodiments of the present disclosure may include a communication system in which terminal devices are directly connected, or in other words, the communication system may include no network device.

It can be appreciated that, in the embodiments of the present disclosure, a device having a communication function in a network/system may be referred to as a communication device. Taking the communication system 100 shown in FIG. 1 as an example, the communication devices may include the network device10, the first terminal device 110 and the second terminal device 120 with communication functions. The network device 10, the first terminal device 110 and the second terminal device 120 may be the specific devices described above, and details thereof will be omitted here. The communication devices may also include other devices in the communication system 100, e.g., other network entities such as a network controller, an MME, etc., and the embodiment of the present disclosure is not limited to any of these examples.

In addition, the terms "system" and "network" may often be used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

It can be appreciated that the term "indication" as used in the embodiments of the present disclosure may be a direct indication, an indirect indication, or an association. For example, if A indicates B, it may mean that A directly indicates B, e.g., B can be obtained from A. Alternatively, it may mean that A indicates B indirectly, e.g., A indicates C and B can be obtained from C. Alternatively, it may mean that there is an association between A and B.

Optionally, indication information in the embodiment of the present disclosure may include physical layer signaling e.g., at least one of Downlink Control Information (DCI), Radio Resource Control (RRC) signaling, or a Media Access Control Element MAC (CE).

In the description of the embodiments of the present disclosure, the term "corresponding" may mean that there is a direct or indirect correspondence between the two, or may mean that there is an association between the two, or that they are in a relation of indicating and indicated, configuring or configured, or the like.

An unlicensed spectrum is a spectrum allocated by a country and region to be used for radio device communication. This spectrum is generally considered to be a shared spectrum, that is, communication devices in different communication systems can use this spectrum as long as they meet the regulatory requirements set by the country or region on the spectrum, without the need to apply for an exclusive spectrum license from the government.

In order to enable various communication systems that use unlicensed spectrum for wireless communication to coexist properly on this spectrum, some countries or regions have regulatory requirements that must be met when using the unlicensed spectrum. For example, communication devices follow a "Listen Before Talk (LBT)" principle. That is, before a communication device transmits a signal on an unlicensed spectrum channel, it needs to perform channel listening first, and only when the channel listening result indicates that the channel is idle, the communication device can transmit the signal. If the channel listening result of the communication device on the channel of the unlicensed spectrum indicates that the channel is busy, the communication device cannot transmit the signal. In order to ensure fairness, in a transmission, the time length of signal transmission by a communication device using a channel on an unlicensed spectrum cannot exceed Maximum Channel Occupancy Time (MCOT).

The present disclosure can be applied to the unlicensed spectrum as well as the licensed spectrum.

HARQ-ACK Feedback in NR-U

When the NR system is applied in an unlicensed frequency band, it can support standalone network deployment, that is, it does not rely on a carrier on the licensed frequency band to provide auxiliary services. In this scenario, after receiving a Physical Downlink Shared Channel (PDSCH) on an unlicensed carrier, a terminal device needs to transmit a HARQ-ACK feedback corresponding to the PDSCH on the unlicensed carrier. The HARQ-ACK feedback information includes ACK information or NACK information, and the HARQ-ACK information can indicate a decoding result of the PDSCH.

On the unlicensed frequency band, Downlink Control Information (DCI) for scheduling the PDSCH transmission may include HARQ timing indication information (e.g., PDSCH-to-HARQ_feedback timing indicator). In addition to being used for determining the time domain position of HARQ-ACK feedback resources (e.g., PUCCH resources) for transmitting the HARQ-ACK corresponding to the PDSCH, the HARQ timing indication information may also indicate a state in which the HARQ-ACK information corresponding to the PDSCH is not fed back temporarily. For example, a pre-configured HARQ timing set includes a non-numerical (NN) value K1 (also referred to as invalid K1 or an invalid value of K1, for example, when K1 has a value of −1) that indicates an invalid resource indication. When the HARQ timing indication information indicates NN K1 in the HARQ timing set, it indicates that the time domain position, such as time slot, where the corresponding HARQ-ACK feedback resource is located cannot be determined temporarily.

In the unlicensed frequency band, in addition to dynamic codebook (Dynamic or Type2) feedback of Release 15 (R15), enhanced dynamic codebook (enhanced Dynamic or enhanced Type2 or eType2) feedback and one-shot HARQ-ACK feedback (or Type 3) codebook feedback are also supported.

For one-shot HARQ-ACK feedback, the network device can configure one-shot HARQ-ACK feedback for the terminal device, and trigger the terminal device to perform one-shot HARQ-ACK feedback via DCI, such as DCI format 1_1. The one-shot HARQ-ACK feedback includes HARQ-ACK information feedback corresponding to all HARQ processes on all configured carriers in a Physical Uplink Control Channel (PUCCH) group. If the terminal device is configured with one-shot HARQ-ACK feedback, the DCI, such as DCI format 1_1, may include an information field of One-shot HARQ-ACK request. If the terminal device receives the DCI information transmitted by the network device, and the information field of one-shot HARQ-ACK request in the DCI information is a predetermined value, for example, set to 1, the terminal device needs to perform one-shot HARQ-ACK feedback. Here, the DCI may be downlink grant information, and the DCI may schedule a Physical Downlink Shared Channel (PDSCH) transmission, or may schedule no PDSCH transmission.

The above codebook schemes can flexibly feed back HARQ-ACK information corresponding to the PDSCH scheduled on the unlicensed frequency band.

One-Shot HARQ-ACK Feedback

In the NR-U system, the network device can configure one-shot HARQ-ACK feedback (also referred to as single-shot HARQ-ACK feedback) for the terminal device, and trigger the terminal device to perform one-shot HARQ-ACK feedback via DCI, e.g., DCI format 1_1. In the one-shot HARQ-ACK feedback, the HARQ-ACK codebook includes HARQ-ACK information corresponding to all HARQ processes on all configured carriers in a PUCCH group. Specifically, it can include two types: Type 1 is one-shot HARQ-ACK feedback carrying a New Data Indicator (NDI), and Type 2 is one-shot HARQ-ACK feedback carrying no NDI. The network device can configure whether the terminal device needs to carry NDI information when performing HARQ-ACK feedback via Radio Resource Control (RRC) signaling.

It should be noted that, in some scenarios, a carrier and a cell may be the same concept, or the carrier may also be replaced by a cell.

In the one-shot HARQ-ACK feedback, for a carrier configured with Code Block Group (CBG) based transmission (e.g., when the terminal device is provided with signaling of information on maximum code block group included in each transport block (maxCodeBlockGroupsPerTransportBlock), the network device can configure whether the terminal device needs to perform CBG-based feedback when performing one-shot HARQ-ACK feedback via RRC signaling (e.g., pdsch-HARQ-ACK-OneShotFeedback-CBG-r16). If the terminal device is configured with CBG-based feedback on a carrier, the terminal device needs to perform CBG-based feedback when performing one-shot HARQ-ACK feedback for the carrier.

As an example, taking the HARQ scheduling process shown in FIG. 2 as an example, the Type 1 and Type 2 one-shot HARQ-ACK feedback will be described. It is assumed that the terminal device is configured with two Component Carriers (CC), denoted as CC1 and CC2 respectively. Both CC1 and CC2 are configured with Transport block (TB) based feedback, and one HARQ process on CC1 and CC2 corresponds to 1-bit HARQ-ACK information. As shown in FIG. 2, on time slot n, the terminal device receives PDSCH 1 scheduled by DCI 1 for HARQ 4 on CC1, with K1=3, one-shot=0 (i.e., no one-shot HARQ-ACK feedback is triggered), NDI=1. The terminal device receives PDSCH 2 scheduled by DCI 2 for HARQ 5 on CC2, with K1=3, one-shot=0, NDI=0. On time slot n+1, the terminal device receives PDSCH 3 scheduled by DCI 3 for HARQ 8 on CC1, with K1=2, one-shot=0, NDI=0. On time slot n+2, the terminal device receives PDSCH 4 scheduled by DCI 4 for HARQ 9 on CC2, with K1=1, one-shot=1 (i.e., one-shot HARQ-ACK feedback is triggered), NDI=1. Specifically, the Type 1 one-shot HARQ-ACK feedback codebook may be shown at A in FIG. 2. The HARQ-ACK feedback and NDI feedback for PDSCH 1 are at the 9th bit and the 10th bit, the HARQ-ACK feedback and NDI feedback for PDSCH 3 are at the 17th bit and the 18th bit, the HARQ-ACK feedback and NDI feedback for PDSCH 2 are at the 43rd bit and the 44th bit, and the HARQ-ACK feedback and NDI feedback for PDSCH 4 are at the 51st bit and the 52nd bit. Specifically, the Type 2 one-shot HARQ-ACK feedback codebook may be shown at B in FIG. 2. The HARQ-ACK feedback for PDSCH 1 is at the 5th bit, and the HARQ-ACK feedback for PDSCH 3 is at the 9th bit, the HARQ-ACK feedback for PDSCH 2 is at the 22nd bit, and the HARQ-ACK feedback for PDSCH 4 is at the 26th bit. After generating the one-shot HARQ-ACK codebook according to the Type 1 or Type 2 HARQ-ACK codebook generation scheme, the terminal device can transmit the one-shot HARQ-ACK codebook on PUCCH Resource 1 in time slot n+3.

It should be understood that in the above FIG. 2, one-shot=0 means that the information field of one-shot HARQ-ACK feedback request in the DCI format is set to 0, which means that one-shot feedback is not triggered. One-shot=1 means that the information field of one-shot HARQ-ACK feedback request in the DCI format is set to 1, which means that one-shot feedback is triggered. In addition, K1 represents HARQ timing indication information. For example, the terminal device receives PDSCH 1 scheduled by DCI 1 for HARQ 4 on time slot n, and K1=3, then the terminal device feeds back the corresponding HARQ-ACK information on time slot n+3.

HARQ-ACK Feedback in Sidelink System

In the NR-Sidelink system, the terminal device can determine one or more sub-channels from N sub-channels according to indication information in a received Sidelink Control Information (SCI) format. The SCI format is used to schedule reception of a Physical Sidelink Shared Channel (PSSCH), and the one or more sub-channels are used for transmission of a Physical Sidelink Feedback Channel (PSFCH), which is used to transmit HARQ-ACK information corresponding to reception of the PSSCH. The HARQ-ACK information provided by the terminal device includes an Acknowledgement (ACK) or a Negative Acknowledgement (NACK), or the HARQ-ACK information provided by the terminal device only includes a NACK. In the case where the HARQ-ACK information provided by the terminal device only includes the NACK, it can be considered that the terminal device does not feed back the corresponding HARQ-ACK information after correctly receiving the PSSCH.

The SCI formats for scheduling reception of the PSSCH include a first-stage SCI format (1st-stage SCI format) and a second-stage SCI format (2nd-stage SCI format). The first-stage SCI format includes SCI format 0_1, which is used for scheduling the PSSCH and the second-stage SCI on the PSSCH. For example, SCI format 0_1 may include at least one of the following indication information: a priority indication, a frequency domain resource allocation, a time domain resource allocation, a Demodulation Reference Signal (DMRS) pattern, a number of DMRS ports (or a number of transmission layers), a second-stage SCI format indication (for example, information bit size indication of the second-stage SCI), or a Modulation and Coding Scheme (MCS). The second-stage SCI format includes SCI format 0_2, which is used for PSSCH decoding. For example, SCI format 02 may include at least one of the following indication information: a HARQ process identifier (ID), a New Data Indicator (NDI), a Redundancy Version (RV), a source identification (ID), or a destination ID. The source ID may include ID indication information of the transmitting terminal device, and the destination ID may include ID indication information of the receiving terminal device.

Since the PSSCH includes only one transport block, which corresponds to 1-bit HARQ-ACK information, one PSFCH is used to transmit 1-bit HARQ-ACK information. If the terminal device needs to feed back multiple PSFCHs on one time slot, the terminal device can feed back some or all of the PSFCHs according to the priorities of the PSSCHs and/or the capability of the terminal device to transmit the PSFCHs simultaneously. Alternatively, the terminal device may determine not to feed back some or all of the PSFCHs according to the priorities of the PSSCHs and/or the capability of the terminal device to transmit the PSFCHs simultaneously.

If the sidelink system (SL-U) is supported on the shared spectrum or unlicensed spectrum, in the HARQ-ACK feedback process, since the terminal device needs to transmit a PSFCH after an LBT succeeds, if the LBT fails, the terminal device cannot transmit the PSFCH, so the HARQ-ACK feedback scheme in the SL system needs to be enhanced.

Based on the above problems, the present disclosure proposes a HARQ-ACK codebook feedback scheme, capable of supporting one-shot HARQ-ACK codebook feedback and HARQ-ACK retransmission in the SL-U system, and optimizes communication in the SL-U system on the shared spectrum.

The technical solutions of the present disclosure will be described in detail below with reference to specific embodiments.

Figure 3:
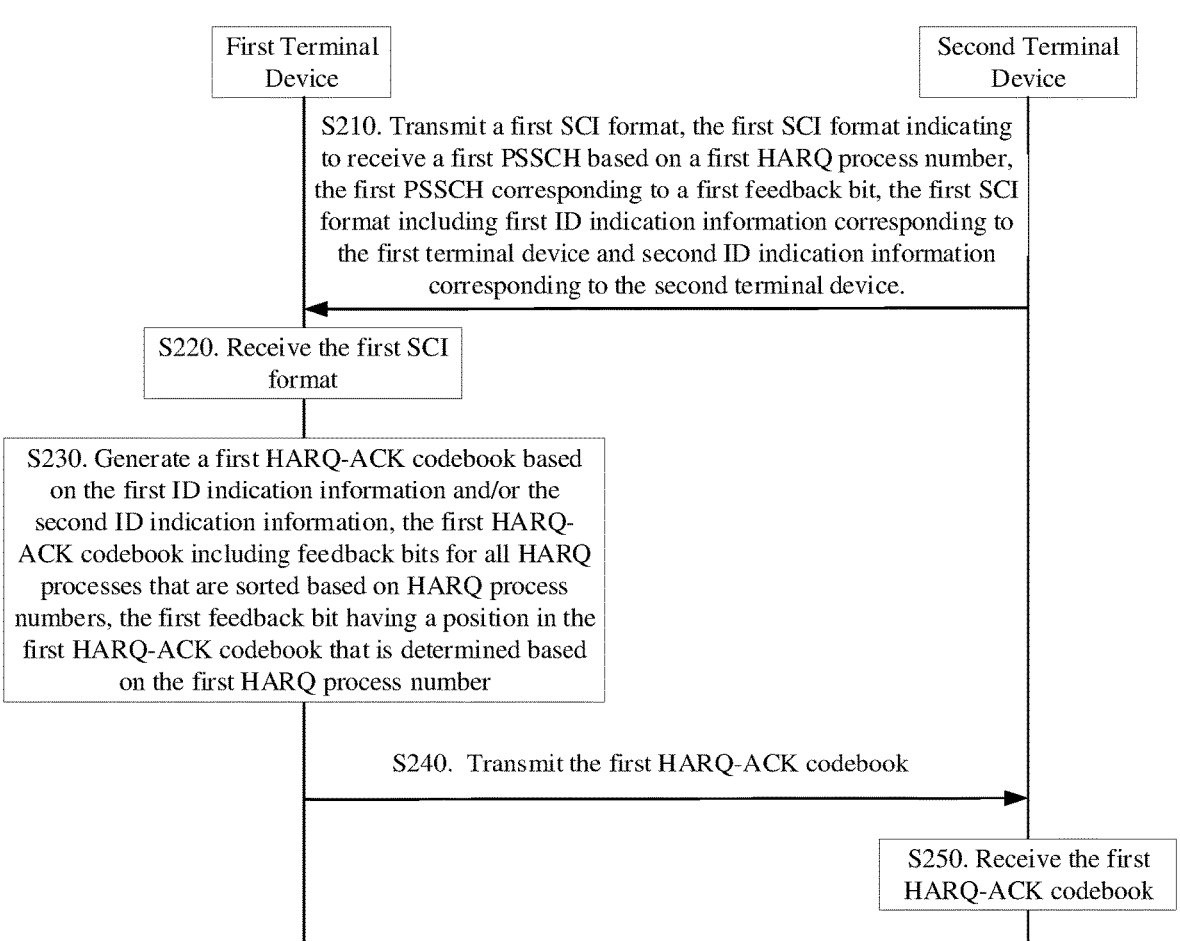
FIG. 3 is a schematic flowchart illustrating a HARQ-ACK codebook feedback method according to an embodiment of the present disclosure.

FIG. 3 is a schematic flowchart illustrating a HARQ-ACK codebook feedback method 200 according to an embodiment of the present disclosure. As shown in FIG. 3, the method 200 may include at least part of the following contents.

At S210, a second terminal device transmits a first SCI format to a first terminal device. The first SCI format indicates to receive a first PSSCH based on a first HARQ process number. The first PSSCH corresponds to a first feedback bit. The first SCI format including first identification (ID) indication information corresponding to the first terminal device and second ID indication information corresponding to the second terminal device.

At S220, the first terminal device receives the first SCI format.

At S230, the first terminal device generates a first HARQ-ACK codebook based on the first ID indication information and/or the second ID indication information. The first HARQ-ACK codebook includes feedback bits for all HARQ processes that are sorted based on HARQ process numbers. The first feedback bit has a position in the first HARQ-ACK codebook that is determined based on the first HARQ process number.

At S240, the first terminal device transmits the first HARQ-ACK codebook to the second terminal device.

At S250, the second terminal device receives the first HARQ-ACK codebook.

Optionally, the method 200 can be applied in a D2D system or an SL-U system. In addition, it can also be applied in other communication systems, and the present disclosure is not limited to any of these examples.

In an embodiment of the present disclosure, for the sidelink system, a one-shot HARQ-ACK codebook feedback scheme is introduced. That is, in a communication link between the first terminal device and the second terminal device, the first terminal device can feed back HARQ-ACK information corresponding to all HARQ processes over a feedback channel, such as a PSFCH.

It should be noted that, in an embodiment of the present disclosure, the first terminal device receiving the first SCI format may be understood as: the first terminal device receiving SCI in the first SCI format. For example, the first terminal device receiving SCI format 0_1 can be understood as: the first terminal device receiving SCI in SCI format 0_1. For example, the SCI format may include SCI format 0_1, SCI format 0_2, etc.

Optionally, the first SCI format may include indication information on the first HARQ process number.

Optionally, the first ID indication information may indicate a part of information in an ID of the first terminal device, or the first ID indication information may indicate the ID of the first terminal device.

When the first ID indication information indicates the part of the information in the ID of the first terminal device, the first PSSCH may include indication information indicating remaining information in the ID of the first terminal device, or the first ID indication information and indication information included in the first PSSCH may jointly indicate the ID of the first terminal device.

Optionally, the first ID indication information may include destination ID indication information in SCI format 0_2.

Optionally, the second ID indication information may indicate a part of information in an ID of the second terminal device, or the second ID indication information may indicate the ID of the second terminal device.

When the second ID indication information indicates the part of the information in the ID of the second terminal device, the first PSSCH may include indication information indicating remaining information in the ID of the second terminal device, or the second ID indication information and indication information included in the first PSSCH may jointly indicate the ID of the second terminal device.

Optionally, the second ID indication information may include source ID indication information in SCI format 0_2.

Optionally, in an embodiment of the present disclosure, the first terminal device may be configured or set to be in a one-shot HARQ-ACK codebook feedback.

For example, the first terminal device may be configured or set by a network device or a controlling terminal device to be in the one-shot HARQ-ACK codebook feedback, or the first terminal device may be pre-configured to be in the one-shot HARQ-ACK codebook feedback.

Optionally, in an embodiment of the present disclosure, the first terminal device reports whether it has a capability of supporting one-shot HARQ-ACK codebook feedback, or the first terminal device declares whether it supports one-shot HARQ-ACK codebook feedback.

For example, the first terminal device reports to a network device or a controlling terminal device whether it supports one-shot HARQ-ACK codebook feedback.

Optionally, in an embodiment of the present disclosure, the first feedback bit includes an ACK or NACK corresponding to reception of the first PSSCH. For example, if the first terminal device successfully receives the first PSSCH, the first feedback bit includes an ACK; or if the first terminal device fails to receive the first PSSCH, the first feedback bit includes a NACK. Alternatively, the first feedback bit includes a NACK corresponding to the reception of the first PSSCH. For example, if the first terminal device successfully receives the first PSSCH, the first feedback bit is not generated, or the first feedback bit does not include an ACK corresponding to the reception of the first PSSCH. If the first terminal device fails to receive the first PSSCH, the first feedback bit includes a NACK.

Optionally, the one-shot HARQ-ACK codebook feedback may also be referred to as Type-3 codebook feedback.

Optionally, the above S230 may specifically include one of:

generating, by the first terminal device, the first HARQ-ACK codebook based on the same first ID indication information and the same second ID indication information;

generating, by the first terminal device, the first HARQ-ACK codebook based on the same first ID indication information; or generating, by the first terminal device, the first HARQ-ACK codebook based on the same second ID indication information.

It should be noted that, in the D2D system, any two terminal devices may communicate with each other. However, for feedback, a particular receiving terminal device needs to provide feedback to a particular transmitting terminal device. Therefore, when generating the HARQ-ACK codebook, it is necessary to check whether the transmitting terminal device of the PSSCH corresponding to the HARQ-ACK bit to be fed back is the same terminal device.

Optionally, in some embodiments, the first SCI format may further include first indication information indicating to generate the first HARQ-ACK codebook, or indicating not to generate the first HARQ-ACK codebook.

Optionally, the first terminal device may determine whether to generate the first HARQ-ACK codebook according to the first indication information.

Assuming that the first indication information includes 1 bit:

if the 1 bit indicates a first predetermined value, such as "1", the first terminal device feeds back the feedback bits corresponding to all HARQ processes according to one-shot HARQ-ACK codebook feedback; or if the 1 bit indicates a second predetermined value, such as "0", it includes one of the following two cases:

(1) the first terminal device feeds back the first feedback bit corresponding to the first HARQ process; and (2) the first terminal device provides no feedback for the currently received first SCI format (subsequently, feedback may be provided based on other received SCI formats, for example, when the second SCI format is received later and the second SCI format indicates one-shot HARQ-ACK feedback, the first feedback bit may be included in the codebook feedback).

Optionally, in an embodiment of the present disclosure, when the first terminal device determines to generate the first HARQ-ACK codebook according to the first indication information, the first terminal device generates the first HARQ-ACK codebook according to the first ID indication information and/or the second ID indication information, and the first terminal device transmits the first HARQ-ACK codebook on a first feedback resource; or when the first terminal device determines not to generate the first HARQ-ACK codebook according to the first indication information, the first terminal device generates the first feedback bit, and the first terminal device transmits the first feedback bit on the first feedback resource.

Optionally, in an embodiment of the present disclosure, when the first indication information indicates a first predetermined value, the first indication information indicates to generate the first HARQ-ACK codebook or indicates one-shot HARQ-ACK codebook feedback; or when the first indication information indicates a second predetermined value, the first indication information indicates not to generate the first HARQ-ACK codebook, or indicates to feed back the first feedback bit on one feedback resource, or indicates not to feed back the first feedback bit according to the first SCI format.

For example, the first indication information may include 1 bit, and when the 1 bit indicates a predetermined value such as "1", it indicates that the first terminal device needs to generate the first HARQ-ACK codebook. Alternatively, when the 1 bit indicates a predetermined value such as "0", it indicates that the first terminal device does not need to generate the first HARQ-ACK codebook. Alternatively, when the 1 bit indicates a predetermined value such as "0", it indicates that the first terminal device is instructed to feed back a feedback bit corresponding to a PSFCH over a feedback resource. Alternatively, when the 1 bit indicates a predetermined value such as "0", it indicates that the first terminal device does not feed back the feedback bit corresponding to the currently received PSFCH temporarily.

Optionally, when the first indication information indicates to generate the first HARQ-ACK codebook, or the first indication information indicates a first predetermined value such as "1", the first HARQ-ACK codebook corresponds to a first PSFCH format, and a maximum number of information bits for feedback information that the first PSFCH format is capable of carrying is greater than 2.

Optionally, when the first indication information indicates not to generate the first HARQ-ACK codebook, or the first indication information indicates a second predetermined value such as "0", the first feedback bit corresponds to a second PSFCH format, and a maximum number of information bits for feedback information that the second PSFCH format is capable of carrying is smaller than or equal to 2. In this case, the HARQ-ACK information corresponding to the reception of the first PSSCH is transmitted in the second PSFCH format.

Optionally, the first SCI format may include a second-stage SCI format, and the second-stage SCI format may include the first indication information; or the first SCI format may include a first-stage SCI format, and the first-stage SCI format may include the first indication information.

For example, the first SCI format may include the second-stage SCI format, and the second-stage SCI format may include the first indication information, the first ID indication information, and the second ID indication information. In this case, the first SCI format may include both the first-stage SCI format and the second-stage SCI format, but only the second-stage SCI format includes the first indication information, the first ID indication information, and the second ID indication information.

In another example, the first SCI format may include a first-stage SCI format, and the first-stage SCI format includes the first indication information, the first ID indication information, and the second ID indication information.

In yet another example, the first SCI format may include the first-stage SCI format and the second-stage SCI format. The first-stage SCI format includes the first indication information, and the second-stage SCI format includes the first ID indication information and the second ID indicates information.

Optionally, the first indication information may be Radio Resource Control (RRC) signaling, or, the first indication information may be Media Access Control Control Element (MAC CE) signaling. Alternatively, the first indication information may be physical layer signaling.

Optionally, in some embodiments, a number of HARQ processes included in communication between the first terminal device and the second terminal device may be configured by a network device or a controlling terminal device, or may be pre-configured or agreed in a protocol. Optionally, the network device or the controlling terminal device does not configure the number of HARQ processes included in communication between the first terminal device and the second terminal device, and the number of HARQ processes can be a default value, for example, a default value of 8.

Optionally, in some embodiments, a number of HARQ processes included in communication of the first terminal device may be configured by a network device or a controlling terminal device, or may be pre-configured or agreed in a protocol. Optionally, the network device or the controlling terminal device does not configure the number of HARQ processes included in the communication of the first terminal device, and the number of HARQ processes can be a default value, for example, a default value of 8.

Optionally, in some embodiments, a number of HARQ processes included in communication of the second terminal device may be configured by a network device or a controlling terminal device, or may be pre-configured or agreed in a protocol. Optionally, the network device or the controlling terminal device does not configure the number of HARQ processes included in the communication of the second terminal device, and the number of HARQ processes can be a default value, for example, a default value of 8.

Optionally, in some embodiments, the first HARQ-ACK codebook may further include New Data Indicator (NDI) feedback information, and the first feedback bit may further include first NDI information corresponding to the first PSSCH.

Optionally, the first SCI format may include indication information on the first NDI.

Optionally, the first terminal device may be configured with NDI feedback. For example, the first terminal device may be configured with NDI feedback by a network device or a controlling terminal device.

Optionally, in some embodiments, the first SCI format may further include second indication information, and the second indication information may indicate information on transmission of the first HARQ-ACK codebook.

Optionally, the information on transmission of the first HARQ-ACK codebook indicated by the second indication information includes at least one of:

a first feedback resource, a time domain position of the first feedback resource, or a Transmission Power Control (TPC) command corresponding to the transmission of the first HARQ-ACK codebook. The first feedback resource is used to transmit the first HARQ-ACK codebook or the first feedback bit.

That is, in the above S240, the first terminal device may transmit the first HARQ-ACK codebook to the second terminal device on the first feedback resource.

Optionally, in an embodiment of the present disclosure, the first SCI format may include a second-stage SCI format including the second indication information; the first SCI format may include a first-stage SCI format including the second indication information; or the first SCI format may include a first-stage SCI format and a second-stage SCI format, the first-stage SCI format including a part of the second indication information, and the second-stage SCI format including another part of the second indication information.

When the first SCI format includes the first-stage SCI format and the second-stage SCI format, the first-stage SCI format includes a part of the second indication information, and the second-stage SCI format includes another part of the second indication information. For example, the second indication information includes a resource indication of the first feedback resource and a time domain position indication of the first feedback resource. Here, the first-stage SCI format may include the time domain position indication of the first feedback resource, and the second-stage SCI format may include the resource indication of the first feedback resource.

For example, the first SCI format may include the second-stage SCI format, and the second-stage SCI format includes the second indication information, the first ID indication information, and the second ID indication information. In this case, the first SCI format may include both the first-stage SCI format and the second-stage SCI format, but only the second-stage SCI format includes the second indication information, the first ID indication information and the second ID indication information.

In another example, the first SCI format may include a first-stage SCI format, and the first-stage SCI format includes the second indication information, the first ID indication information, and the second ID indication information.

In yet another example, the first SCI format may include the first-stage SCI format and the second-stage SCI format. The first-stage SCI format includes the second indication information, and the second-stage SCI format includes the first ID indication information and the second ID indicates information.

Figure 4:
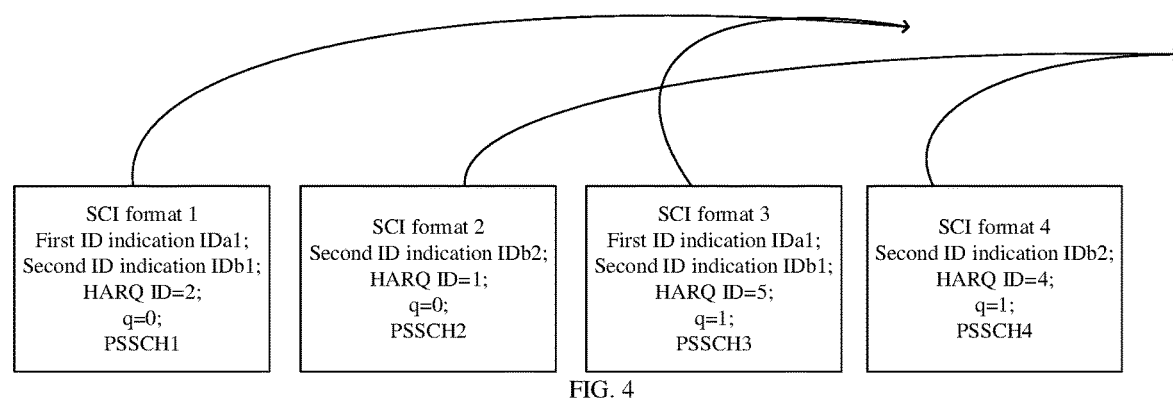
FIG. 4 is a schematic diagram showing a HARQ-ACK codebook feedback according to an embodiment of the present disclosure.

It should be noted that in the shared spectrum scenario, before transmitting a signal, a communication device needs to perform a channel access procedure or need to perform words, the first HARQ-ACK codebook corresponds to the same first ID indication information and the same second ID indication information. As shown in FIG. 4, in a D2D unicast transmission, the second terminal device corresponding to IDb1 transmits PSSCH 1 and PSSCH 3 to the first terminal device corresponding to IDa1, with PSSCH 1 corresponding to SCI format 1 and PSSCH 3 corresponding to SCI format 3. Since q="0" in SCI format 1, the first terminal device does not feed back the HARQ-ACK bit corresponding to PSSCH 1 according to SCI format 1. In addition, since q="1" in SCI format 3, after receiving PSSCH 1 and PSSCH 3, the terminal device can feed back the HARQ-ACK bits corresponding to both PSSCH 1 and PSSCH 3 in the HARQ-ACK codebook generated based on SCI format 3.

Specifically, after the first terminal device receives PSSCH 1 and PSSCH 3, the HARQ-ACK codebook generated for the communication link between IDb1 and IDa1 according to q="1" in SCI format 3 may be shown in Table 1.

TABLE 1

| NACK | NACK | Decoding result of PSSCH 1 | NACK | NACK | Decoding result of PSSCH 3 | NACK | NACK |
|------|------|----------------------------|------|------|----------------------------|------|------|
| HARQ0 | HARQ1 | HARQ2 | HARQ3 | HARQ4 | HARQ5 | HARQ6 | HARQ7 | channel listening or channel detection. If the spectrum is currently occupied, signal transmission cannot be performed. Therefore, there may be a case in which transmission cannot be performed in the shared spectrum scenario.

Therefore, optionally, on the shared spectrum, the above step S240 may include: transmitting, by the first terminal device after having access to a channel, the first HARQ-ACK codebook to the second terminal device, or transmitting, by the first terminal device after succeeding in channel access, the first HARQ-ACK codebook to the second terminal device.

Therefore, in the embodiments of the present disclosure, one-shot HARQ-ACK codebook feedback and HARQ-ACK retransmission in the SL-U system can be supported, which optimizes the communication in the SL-U system on the shared spectrum.

The HARQ-ACK codebook feedback method 200 in the present disclosure will be described in detail below with reference to Embodiment 1 to Embodiment 4.

In Embodiment 1, the first SCI format includes the indication information on the first HARQ process number, the first ID indication information, the second ID indication information, and the first indication information. Here, the first indication information is represented as q, with q="1" indicating to generate the first HARQ-ACK codebook, and q="0" indicating not to generate the first HARQ-ACK codebook or not to feed back the corresponding HARQ-ACK bit temporarily. It is assumed here that the number of HARQ processes is 8, and one PSSCH channel corresponds to 1-bit HARQ-ACK information.

In an implementation of Embodiment 1, the first terminal device generates the first HARQ-ACK codebook based on the first ID indication information, the second ID indication information, and the first indication information. In other That is, the HARQ-ACK codebook does not include any decoding result of PSSCH corresponding to different first ID indication information or different second ID indication information. Optionally, for the HARQ process not received by the first terminal device, the feedback bit corresponding to the HARQ process not received in the HARQ-ACK codebook includes NACK information occupancy.

In another implementation of Embodiment 1, the first terminal device generates the first HARQ-ACK codebook based on the second ID indication information and the first indication information. In other words, the first HARQ-ACK codebook corresponds to the same second ID indication information. As shown in FIG. 4, in a D2D multicast or broadcast transmission, the second terminal device corresponding to IDb2 transmits PSSCH 2 and PSSCH 4 by means of multicast or broadcast, with PSSCH 2 corresponding to SCI format 2, and PSSCH 4 corresponding to SCI format 4. Since q="0" in SCI format 2, the first terminal device does not feed back the HARQ-ACK bit corresponding to PSSCH 2 according to SCI format 2. In addition, since q="1" in SCI format 4, after receiving PSSCH 2 and PSSCH 4, the terminal device can feed back the HARQ-ACK bits corresponding to both PSSCH 2 and PSSCH 4 in the HARQ-ACK codebook generated based on SCI format 4.

Specifically, after the first terminal device receives PSSCH 2 and PSSCH 4, the HARQ-ACK codebook generated for the second terminal device corresponding to IDb2 according to q="1" in SCI format 4 may be shown in Table 2.

TABLE 2

| NACK | Decoding result of PSSCH 2 | NACK | NACK | Decoding result of PSSCH 4 | NACK | NACK | NACK |
|---|---|---|---|---|---|---|---|
| HARQ0 | HARQ1 | HARQ2 | HARQ3 | HARQ4 | HARQ5 | HARQ6 | HARQ7 |

That is, the HARQ-ACK codebook does not include any decoding result of PSSCH corresponding to different second ID indication information. Optionally, for the HARQ process not received by the first terminal device, the feedback bit corresponding to the HARQ process not received in the HARQ-ACK codebook includes NACK information occupancy.

Embodiment 2 (the first feedback bit includes the first NDI information), the first SCI format includes the indication information on the first HARQ process number, the first ID indication information, the second ID indication information, the first NDI indication information, and the first indication information. Here, the first HARQ-ACK codebook includes NDI feedback information. The first indication information is represented as q, with q="1" indicating to generate the first HARQ-ACK codebook, and q="O" indicating not to generate the first HARQ-ACK codebook or not to feed back the corresponding HARQ-ACK bit temporarily. It is assumed here that the number of HARQ processes is 8, and one PSSCH channel corresponds to 1-bit HARQ-ACK information and 1-bit NDI information.

In an implementation of Embodiment 2, the first terminal device generates the first HARQ-ACK codebook based on the first ID indication information, the second ID indication information, the first NDI indication information, and the first indication information. In other words, the first HARQ-ACK codebook corresponds to the same first ID indication information and the same second ID indication information. As shown in FIG. 5, in a D2D unicast transmission, the second terminal device corresponding to IDb1 transmits PSSCH 1 and PSSCH 3 to the first terminal device corresponding to IDa1, with PSSCH 1 corresponding to SCI format 1, and PSSCH 3 corresponding to SCI format 3. Since q="O" in SCI format 1, the first terminal device does not feed back the HARQ-ACK bit corresponding to PSSCH 1 according to SCI format 1. In addition, since q="1" in SCI format 3, after receiving PSSCH 1 and PSSCH 3, the terminal device can feed back the HARQ-ACK bits corresponding to both PSSCH 1 and PSSCH 3 in the HARQ-ACK codebook generated based on SCI format 3.

Specifically, after the first terminal device receives PSSCH 1 and PSSCH 3, the HARQ-ACK codebook generated for the communication link between IDb1 and IDa1 according to q="1" in SCI format 3 may be shown in Table 3.

TABLE 3

| NACK | 0 | NACK | 0 | Decoding result of PSSCH 1 | 1 | NACK | 0 |
|---|---|---|---|---|---|---|---|
| HARQ0 | NDI0 | HARQ1 | NDI1 | HARQ2 | NDI2 | HARQ3 | NDI3 |
| NACK | 0 | Decoding result of PSSCH 3 | 0 | NACK | 0 | NACK | 0 |
| HARQ4 | NDI4 | HARQ5 | NDI5 | HARQ6 | NDI6 | HARQ7 | NDI7 |

That is, the HARQ-ACK codebook does not include any decoding result of PSSCH corresponding to different first ID indication information or different second ID indication information. Optionally, for the HARQ process not received by the first terminal device, the feedback bits corresponding to the HARQ process not received in the HARQ-ACK codebook include NACK information occupancy and the predetermined NDI value of 0.

In another implementation of Embodiment 2, the first terminal device generates the first HARQ-ACK codebook based on the second ID indication information, the first NDI indication information, and the first indication information. In other words, the first HARQ-ACK codebook corresponds to the same second ID indication information. As shown in FIG. 5, in a D2D multicast or broadcast transmission, the second terminal device corresponding to IDb2 transmits PSSCH 2 and PSSCH 4 by means of multicast or broadcast, with PSSCH 2 corresponding to SCI format 2, and PSSCH 4 corresponding to SCI format 4. Since q="O" in SCI format 2, the first terminal device does not feed back the HARQ-ACK bit corresponding to PSSCH 2 according to SCI format 2. In addition, since q="1" in SCI format 4, after receiving PSSCH 2 and PSSCH 4, the terminal device can feed back the HARQ-ACK bits corresponding to PSSCH 2 and PSSCH 4 in the HARQ-ACK codebook generated based on SCI format 4.

Specifically, after the first terminal device receives PSSCH 2 and PSSCH 4, the HARQ-ACK codebook generated for the second terminal device corresponding to IDb2 according to q="1" in SCI format 4 may be shown in Table 4.

TABLE 4

| NACK | 0 | Decoding result of PSSCH 2 | 0 | NACK | 0 | NACK | 0 |
|---|---|---|---|---|---|---|---|
| HARQ0 | NDI0 | HARQ1 | NDI1 | HARQ2 | NDI2 | HARQ3 | NDI3 |
| Decoding result of PSSCH 4 | 1 | NACK | 0 | NACK | 0 | NACK | 0 |
| HARQ4 | NDI4 | HARQ5 | NDI5 | HARQ6 | NDI6 | HARQ7 | NDI7 |

That is, the HARQ-ACK codebook does not include any decoding result of PSSCH corresponding to different second ID indication information. Optionally, for the HARQ process not received by the first terminal device, the feedback bits corresponding to the HARQ process not received in the HARQ-ACK codebook include NACK information occupancy and the predetermined NDI value of 0.

Embodiment 3 (the first feedback bit includes the first NDI information), the first SCI format includes the indication information on the first HARQ process number, the first ID indication information, the second ID indication information, and the first indication information. The first indication information is represented as q, with q="1" indicating to generate the first HARQ-ACK codebook, and q="O" indicating not to generate the first HARQ-ACK codebook or indicating to feed back a feedback bit corresponding to one PSFCH. It is assumed in an example here that the number of HARQ processes is 8, one PSSCH channel corresponds to 1-bit HARQ-ACK information, and the first terminal device generates the first HARQ-ACK codebook based on the first ID indication information, the second ID indication information, and the first indication information.

As a non-limiting example, in Embodiment 3, in a D2D unicast transmission, the second terminal device corresponding to IDb1 transmits PSSCH 1 and PSSCH 2 to the first terminal device corresponding to IDa1, with PSSCH 1 corresponding to feedback resource 0 and PSSCH 2 corresponding to feedback resource 1. Optionally, the maximum number of information bits included in the first PSFCH format as determined by the first terminal device according to q="1" in the SCI format is greater than 2. Optionally, the maximum number of information bits included in the first PSFCH format as determined by the first terminal device according to q="O" in the SCI format is 1 or 2.

In an implementation of Embodiment 3, as shown in FIG. 6, q="1" in SCI format 1 corresponding to PSSCH 1, and after receiving PSSCH 1, the HARQ-ACK codebook to be transmitted on feedback resource 0 as generated by the first terminal device for the communication link between IDb1 and IDa1 according to q="1" in SCI format 1 may be shown in Table 5.

TABLE 5

| NACK | NACK | Decoding result of PSSCH 1 | NACK | NACK | NACK | NACK | NACK |
|---|---|---|---|---|---|---|---|
| HARQ0 | HARQ1 | HARQ2 | HARQ3 | HARQ4 | HARQ5 | HARQ6 | HARQ7 |

As shown in FIG. 6, q="O" in SCI format 2 corresponding to PSSCH 2, and after receiving PSSCH 2, the HARQ-ACK codebook to be transmitted on feedback resource 1 as generated by the first terminal device for the communication link between IDb1 and IDa1 according to q="0" in SCI format 2 may be shown in Table 6.

TABLE 6

Decoding result of PSSCH 2

In another implementation of Embodiment 3, as shown in FIG. 7, q="0" in SCI format 1 corresponding to PSSCH 1, and after receiving PSSCH 1, the HARQ-ACK codebook to be transmitted on feedback resource 0 as generated by the first terminal device for the communication link between IDb1 and IDa1 according to q="0" in SCI format 1 may be shown in Table 7.

TABLE 7

Decoding result of PSSCH 1

Optionally, in the case where q="0" in the SCI format 1, after receiving the PSSCH 1, the first terminal device may not feed back the HARQ-ACK bit corresponding to PSSCH 1 according to the SCI format 1.

As shown in FIG. 7, q="1" in SCI format 2 corresponding to PSSCH 2, and after receiving PSSCH 2, the HARQ-ACK codebook to be transmitted on feedback resource 1 as generated by the first terminal device for the communication link between IDb1 and IDa1 according to q="1" in SCI format 2 includes one of the following cases:

Case a: Feedback resource 1 includes the decoding result of PSSCH 1, as shown in Table 8.

TABLE 8

| | | Decoding result of | Decoding result of | | | | |
| NACK | NACK | PSSCH 1 | PSSCH 2 | NACK | NACK | NACK | NACK |
|---|---|---|---|---|---|---|---|
| HARQ0 | HARQ1 | HARQ2 | HARQ3 | HARQ4 | HARQ5 | HARQ6 | HARQ7 |

Case b: If the first terminal device does not feed back the decoding result of PSSCH 1 on feedback resource 0 (for example, the LBT corresponding to feedback resource 0 on the shared spectrum fails, or the feedback resource 0 and another channel with a higher priority collide in the time domain, or the first terminal device determines not to feed back on feedback resource 0 according to q="0", etc.), feedback resource 1 includes the decoding result of PSSCH 1, as shown in Table 9.

TABLE 9

| NACK | NACK | Decoding result of PSSCH 1 | Decoding result of PSSCH 2 | NACK | NACK | NACK | NACK |
|------|------|---------|---------|------|------|------|------|
| HARQ0 | HARQ1 | HARQ2 | HARQ3 | HARQ4 | HARQ5 | HARQ6 | HARQ7 |

Alternatively, if the first terminal device feeds back the decoding result of PSSCH 1 on feedback resource 0, the decoding result of PSSCH 1 is not included in feedback resource 1, as shown in Table 10.

TABLE 10

| NACK | NACK | NACK | Decoding result of PSSCH 2 | NACK | NACK | NACK | NACK |
|------|------|------|---------|------|------|------|------|
| HARQ0 | HARQ1 | HARQ2 | HARQ3 | HARQ4 | HARQ5 | HARQ6 | HARQ7 |

The method embodiments of the present disclosure have been described in detail above with reference to FIGS. 3 to 7, and the apparatus embodiments of the present disclosure will be described in detail below with reference to FIGS. 8 to 12. It should be understood that the apparatus embodiments and the method embodiments correspond to each other, and for similar description, reference can be made to the method embodiments.

Figures 8, 9, 10, 11, 12:
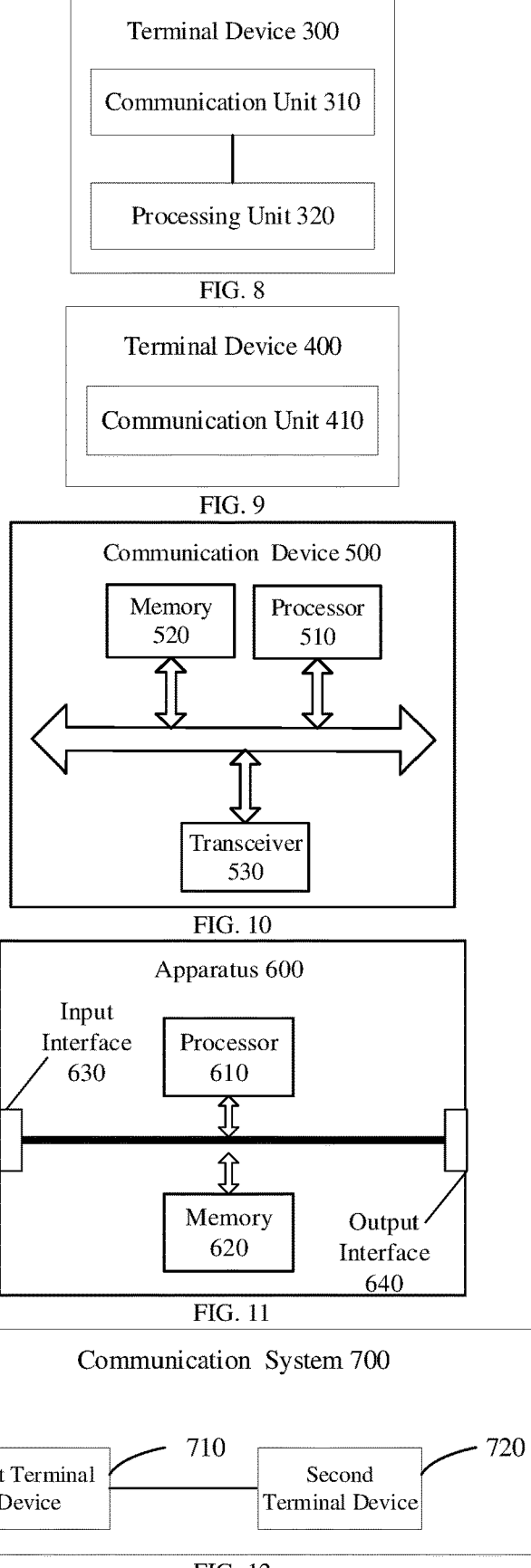
FIG. 8 is a schematic block diagram of a terminal device according to an embodiment of the present disclosure.
FIG. 9 is a schematic block diagram of a terminal device according to another embodiment of the present disclosure.
FIG. 10 is a schematic block diagram of a communication device according to an embodiment of the present disclosure.
FIG. 11 is a schematic block diagram of an apparatus according to an embodiment of the present disclosure.
FIG. 12 is a schematic block diagram of a communication system according to an embodiment of the present disclosure.

FIG. 8 shows a schematic block diagram of a terminal device 300 according to an embodiment of the present disclosure. As shown in FIG. 8, the terminal device 300 is a first terminal device, and the terminal device 300 includes:

a communication unit 310 configured to receive a first SCI format transmitted by a second terminal device, the first SCI format indicating to receive a first PSSCH based on a first HARQ process number, the first PSSCH corresponding to a first feedback bit, and the first SCI format including first ID indication information corresponding to the first terminal device and second ID indication information corresponding to the second terminal device; and a processing unit 320 configured to generate a first HARQ-ACK codebook based on the first ID indication information and/or the second ID indication information, where the first HARQ-ACK codebook includes feedback bits for all HARQ processes that are sorted based on HARQ process numbers, and the first feedback bit has a position in the first HARQ-ACK codebook that is determined based on the first HARQ process number.

Optionally, the first SCI format may include indication information on the first HARQ process number.

Optionally, the first ID indication information may indicate a part of information in an ID of the first terminal device, or the first ID indication information may indicate the ID of the first terminal device.

Optionally, when the first ID indication information indicates the part of the information in the ID of the first terminal device, the first PSSCH may include indication information indicating remaining information in the ID of the first terminal device, or the first ID indication information and indication information included in the first PSSCH may jointly indicate the ID of the first terminal device.

Optionally, the second ID indication information may indicate a part of information in an ID of the second terminal device, or the second ID indication information may indicate the ID of the second terminal device.

Optionally, when the second ID indication information indicates the part of the information in the ID of the second terminal device, the first PSSCH may include indication information indicating remaining information in the ID of the second terminal device, or the second ID indication information and indication information included in the first PSSCH may jointly indicate the ID of the second terminal device.

Optionally, the first terminal device may be configured or set to be in a one-shot HARQ-ACK codebook feedback.

Optionally, the first terminal device may be configured or set by a network device or a controlling terminal device to be in the one-shot HARQ-ACK codebook feedback.

Optionally, the first SCI format may further include first indication information indicating to generate the first HARQ-ACK codebook, or indicating not to generate the first HARQ-ACK codebook.

Optionally, the processing unit 320 may be further configured to determine whether to generate the first HARQ-ACK codebook according to the first indication information.

Optionally, when the first indication information indicates a first predetermined value, the first indication information may indicate to generate the first HARQ-ACK codebook or indicates one-shot HARQ-ACK codebook feedback; or when the first indication information indicates a second predetermined value, the first indication information may indicate not to generate the first HARQ-ACK codebook, or may indicate to feed back the first feedback bit on one feedback resource, or may indicate not to feed back the first feedback bit according to the first SCI format.

Optionally, when the first indication information indicates to generate the first HARQ-ACK codebook, the first HARQ-ACK codebook may correspond to a first Physical Sidelink Feedback Channel (PSFCH) format, and a maximum number of information bits for feedback information that the first PSFCH format is capable of carrying is greater than 2; or when the first indication information indicates not to generate the first HARQ-ACK codebook, the first feedback bit may correspond to a second PSFCH format, and a maximum number of information bits for feedback information that the second PSFCH format is capable of carrying is smaller than or equal to 2.

Optionally, the first SCI format may include a second-stage SCI format, and the second-stage SCI format may include the first indication information; or the first SCI format may include a first-stage SCI format, and the first-stage SCI format may include the first indication information.

Optionally, the first indication information may be Radio Resource Control (RRC) signaling, or the first indication information may be Media Access Control Control Element (MAC CE) signaling, or the first indication information may be physical layer signaling.

Optionally, the processing unit 320 being configured to generate the first HARQ-ACK codebook based on the first ID indication information and/or the second ID indication information includes the processing unit 320 being configured to perform one of:

generating the first HARQ-ACK codebook based on the same first ID indication information and the same second ID indication information;

generating the first HARQ-ACK codebook based on the same first ID indication information; or generating the first HARQ-ACK codebook based on the same second ID indication information.

Optionally, a number of HARQ processes included in communication between the first terminal device and the second terminal device may be configured by a network device or a controlling terminal device, or may be pre-configured or agreed in a protocol.

Optionally, a number of HARQ processes included in communication of the first terminal device may be configured by a network device or a controlling terminal device, or may be pre-configured or agreed in a protocol.

Optionally, a number of HARQ processes included in communication of the second terminal device may be configured by a network device or a controlling terminal device, or may be pre-configured or agreed in a protocol.

Optionally, the first HARQ-ACK codebook may further include New Data Indicator (NDI) feedback information, and the first feedback bit may further include first NDI information corresponding to the first PSSCH.

Optionally, the first SCI format may include indication information on the first NDI.

Optionally, the first terminal device may be configured with NDI feedback.

Optionally, the first SCI format may further include second indication information, and the second indication information may indicate information on transmission of the first HARQ-ACK codebook.

Optionally, the information on transmission of the first HARQ-ACK codebook indicated by the second indication information may include at least one of:

a first feedback resource, a time domain position of the first feedback resource, or a Transmission Power Control (TPC) command corresponding to the transmission of the first HARQ-ACK codebook, where the first feedback resource is used to transmit the first HARQ-ACK codebook or the first feedback bit.

Optionally, the first SCI format may include a second-stage SCI format including the second indication information;

the first SCI format may include a first-stage SCI format including the second indication information; or the first SCI format may include a first-stage SCI format and a second-stage SCI format, where the first-stage SCI format includes a part of the second indication information, and the second-stage SCI format includes another part of the second indication information.

Optionally, the first feedback bit may include an ACK or a NACK corresponding to reception of the first PSSCH; or the first feedback bit may include a NACK corresponding to reception of the first PSSCH.

Optionally, in some embodiments, the above communication unit may be a communication interface or a transceiver, or an input/output interface of a communication chip or a system-on-chip. The above processing unit may be one or more processors.

It should be understood that the terminal device 300 according to the embodiment of the present disclosure may correspond to the first terminal device in the method embodiment of the present disclosure, and the above and other operations and/or functions of the respective units in the terminal device 300 are provided for the purpose of implementing the process flow corresponding to the first terminal device in the method 200 shown in FIG. 3, and details thereof will be not omitted here for brevity.

FIG. 9 shows a schematic block diagram of a terminal device 400 according to an embodiment of the present disclosure. As shown in FIG. 9, the terminal device 400 is a second terminal device, and the terminal device 400 includes:

a communication unit 410 configured to transmit a first SCI format to a first terminal device, the first SCI format indicating to receive a first PSSCH based on a first HARQ process number, the first PSSCH corresponding to a first feedback bit, and the first SCI format including first ID indication information corresponding to the first terminal device and second ID indication information corresponding to the second terminal device.

The communication unit 410 is further configured to receive a first HARQ-ACK codebook transmitted by the first terminal device. The first HARQ-ACK codebook is generated by the first terminal device based on the first ID indication information and/or the second ID indication information, the first HARQ-ACK codebook includes feedback bits for all HARQ processes that are sorted based on HARQ process numbers, and the first feedback bit has a position in the first HARQ-ACK codebook that is determined based on the first HARQ process number.

Optionally, the first SCI format may include indication information on the first HARQ process number.

Optionally, the first ID indication information may indicate a part of information in an ID of the first terminal device, or the first ID indication information may indicate the ID of the first terminal device.

Optionally, when the first ID indication information indicates the part of the information in the ID of the first terminal device, the first PSSCH may include indication information indicating remaining information in the ID of the first terminal device, or the first ID indication information and indication information included in the first PSSCH may jointly indicate the ID of the first terminal device.

Optionally, the second ID indication information may indicate a part of information in an ID of the second terminal device, or the second ID indication information may indicate the ID of the second terminal device.

Optionally, when the second ID indication information indicates the part of the information in the ID of the second terminal device, the first PSSCH may include indication information indicating remaining information in the ID of the second terminal device, or the second ID indication information and indication information included in the first PSSCH may jointly indicate the ID of the second terminal device.

Optionally, the first terminal device may be configured or set to be in a one-shot HARQ-ACK codebook feedback.

Optionally, the first terminal device may be configured or set by a network device or a controlling terminal device to be in the one-shot HARQ-ACK codebook feedback.

Optionally, the first SCI format may further include first indication information indicating to generate the first HARQ-ACK codebook, or indicating not to generate the first HARQ-ACK codebook.

Optionally, the first indication information may be used by the first terminal device to determine whether to generate the first HARQ-ACK codebook.

Optionally, when the first indication information indicates a first predetermined value, the first indication information may indicate to generate the first HARQ-ACK codebook or indicate one-shot HARQ-ACK codebook feedback; or when the first indication information indicates a second predetermined value, the first indication information may indicate not to generate the first HARQ-ACK codebook, or indicate to feed back the first feedback bit on one feedback resource, or indicate not to feed back the first feedback bit according to the first SCI format.

Optionally, when the first indication information indicates to generate the first HARQ-ACK codebook, the first HARQ-ACK codebook may correspond to a first Physical Sidelink Feedback Channel (PSFCH) format, and a maximum number of information bits for feedback information that the first PSFCH format is capable of carrying is greater than 2; or when the first indication information indicates not to generate the first HARQ-ACK codebook, the first feedback bit may correspond to a second PSFCH format, and a maximum number of information bits for feedback information that the second PSFCH format is capable of carrying is smaller than or equal to 2.

Optionally, the first SCI format may include a second-stage SCI format, and the second-stage SCI format may include the first indication information; or the first SCI format may include a first-stage SCI format, and the first-stage SCI format may include the first indication information.

Optionally, the first indication information may be RRC signaling, or the first indication information may be MAC CE signaling, or the first indication information may be physical layer signaling.

Optionally, the first HARQ-ACK codebook may be generated by the first terminal device based on the same first ID indication information and the same second ID indication information;

the first HARQ-ACK codebook may be generated by the first terminal device based on the same first ID indication information; or the first HARQ-ACK codebook may be generated by the first terminal device based on the same second ID indication information.

Optionally, a number of HARQ processes included in communication between the first terminal device and the second terminal device may be configured by a network device or a controlling terminal device, or may be pre-configured or agreed in a protocol.

Optionally, a number of HARQ processes included in communication of the first terminal device may be configured by a network device or a controlling terminal device, or may be pre-configured or agreed in a protocol.

Optionally, a number of HARQ processes included in communication of the second terminal device may be configured by a network device or a controlling terminal device, or may be pre-configured or agreed in a protocol.

Optionally, the first HARQ-ACK codebook may further include NDI feedback information, and the first feedback bit may further include first NDI information corresponding to the first PSSCH.

Optionally, the first SCI format may include indication information on the first NDI.

Optionally, the first terminal device may be configured with NDI feedback.

Optionally, the first SCI format may further include second indication information, and the second indication information may indicate information on transmission of the first HARQ-ACK codebook.

Optionally, the information on transmission of the first HARQ-ACK codebook indicated by the second indication information may include at least one of:

a first feedback resource, a time domain position of the first feedback resource, or a Transmission Power Control (TPC) command corresponding to the transmission of the first HARQ-ACK codebook, where the first feedback resource is used to transmit the first HARQ-ACK codebook or the first feedback bit.

Optionally, the first SCI format may include a second-stage SCI format including the second indication information;

the first SCI format may include a first-stage SCI format including the second indication information; or the first SCI format may include a first-stage SCI format and a second-stage SCI format, where the first-stage SCI format includes a part of the second indication information, and the second-stage SCI format includes another part of the second indication information.

Optionally, the first feedback bit may include an ACK or a NACK corresponding to reception of the first PSSCH; or the first feedback bit may include a NACK corresponding to reception of the first PSSCH.

Optionally, in some embodiments, the above communication unit may be a communication interface or a transceiver, or an input/output interface of a communication chip or a system-on-chip. The above processing unit may be one or more processors.

It should be understood that the terminal device 400 according to the embodiment of the present disclosure may correspond to the second terminal device in the method embodiment of the present disclosure, and the above and other operations and/or functions of the respective units in the terminal device 400 are provided for the purpose of implementing the process flow corresponding to the second terminal device in the method 200 shown in FIG. 3, and details thereof will be not omitted here for brevity.

FIG. 10 is a schematic diagram showing a structure of a communication device 500 according to an embodiment of the present disclosure. The communication device 500 shown in FIG. 10 includes a processor 510, and the processor 510 can invoke and execute a computer program from a memory to implement the method in the embodiment of the present disclosure.

Optionally, as shown in FIG. 10, the communication device 500 may further include a memory 520. The processor 510 can invoke and execute a computer program from the memory 520 to implement the method in the embodiment of the present disclosure.

The memory 520 may be a separate device independent from the processor 510, or may be integrated in the processor 510.

Optionally, as shown in FIG. 10, the communication device 500 may further include a transceiver 530, and the processor 510 may control the transceiver 530 to communicate with other devices, and in particular, transmit information or data to other devices, or receive information or data transmitted by other devices.

Here, the transceiver 530 may include a transmitter and a receiver. The transceiver 530 may further include one or more antennas.

Optionally, the communication device 500 may specifically be the first terminal device according to the embodiment of the present disclosure, and the communication device 500 may implement the corresponding processes implemented by the first terminal device in any of the methods according to the embodiments of the present disclosure. For the sake of brevity, details thereof will be omitted here.

Optionally, the communication device 500 may specifically be the second terminal device according to the embodiment of the present disclosure, and the communication device 500 may implement the corresponding processes implemented by the second terminal device in any of the methods according to the embodiments of the present disclosure. For the sake of brevity, details thereof will be omitted here.

FIG. 11 is a schematic diagram showing a structure of an apparatus according to an embodiment of the present disclosure. The apparatus 600 shown in FIG. 11 includes a processor 610, and the processor 610 can invoke and execute a computer program from a memory to implement the method in the embodiment of the present disclosure.

Optionally, as shown in FIG. 11, the apparatus 600 may further include a memory 620. The processor 610 can invoke and execute a computer program from the memory 620 to implement the method in the embodiment of the present disclosure.

The memory 620 may be a separate device independent from the processor 610, or may be integrated in the processor 610.

Optionally, the apparatus 600 may further include an input interface 630. The processor 610 can control the input interface 630 to communicate with other devices or chips, and in particular, obtain information or data transmitted by other devices or chips.

Optionally, the apparatus 600 may further include an output interface 640. The processor 610 can control the output interface 640 to communicate with other devices or chips, and in particular, output information or data to other devices or chips.

Optionally, the apparatus can be applied to the first terminal device in the embodiment of the present disclosure, and the apparatus can implement the corresponding processes implemented by the first terminal device in the various methods of the embodiments of the present disclosure. For the sake of brevity, details thereof will be omitted here.

Optionally, the apparatus can be applied to the second terminal device in the embodiment of the present disclosure, and the apparatus can implement the corresponding processes implemented by the second terminal device in the various methods of the embodiments of the present disclosure. For the sake of brevity, details thereof will be omitted here.

Optionally, the apparatus in the embodiment of the present disclosure may be a chip, and the chip may also be referred to as a system-level chip, a system-chip, a chip system, or a system-on-chip.

FIG. 12 is a schematic block diagram showing a communication system 700 according to an embodiment of the present disclosure. As shown in FIG. 12, the communication system 700 includes a first terminal device 710 and a second terminal device 720.

Here, the first terminal device 710 can be configured to implement the corresponding functions implemented by the first terminal device in the above method, and the second terminal device 720 can be configured to implement the corresponding functions implemented by the second terminal device in the above method. For the sake of brevity, details thereof will be omitted here.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer readable storage medium storing a computer program.

Optionally, the computer readable storage medium can be applied to the first terminal device in the embodiment of the present disclosure, and the computer program can cause a computer to perform corresponding procedures implemented by the first terminal device in the method according to any of the embodiments of the present disclosure. Details thereof will be omitted here for simplicity.

Optionally, the computer readable storage medium can be applied to the second terminal device in the embodiment of the present disclosure, and the computer program can cause a computer to perform corresponding procedures implemented by the second terminal device in the method according to any of the embodiments of the present disclosure. Details thereof will be omitted here for simplicity.

An embodiment of the present disclosure also provides a computer program product including computer program instructions.

Optionally, the computer program product can be applied to the first terminal device in the embodiment of the present disclosure, and the computer program instructions can cause a computer to perform corresponding procedures implemented by the first terminal device in the method according to any of the embodiments of the present disclosure. Details thereof will be omitted here for simplicity.

Optionally, the computer program product can be applied to the second terminal device in the embodiment of the present disclosure, and the computer program instructions can cause a computer to perform corresponding procedures implemented by the second terminal device in the method according to any of the embodiments of the present disclosure. Details thereof will be omitted here for simplicity.

An embodiment of the present disclosure also provides a computer program.

Optionally, the computer program can be applied to the first terminal device in the embodiment of the present disclosure. The computer program, when executed on a computer, can cause the computer to perform corresponding procedures implemented by the first terminal device in the method according to any of the embodiments of the present disclosure. Details thereof will be omitted here for simplicity.

Optionally, the computer program can be applied to the second terminal device in the embodiment of the present disclosure. The computer program, when executed on a computer, can cause the computer to perform corresponding procedures implemented by the second terminal device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A Hybrid Automatic Repeat reQuest Acknowledgement (HARQ-ACK) codebook feedback method, comprising:

receiving, by a first terminal device, a first Sidelink Control Information (SCI) format transmitted by a second terminal device, the first SCI format indicating to receive a first Physical Sidelink Shared Channel (PSSCH) based on a first HARQ process number, the first PSSCH corresponding to a first feedback bit, and the first SCI format comprising first identification (ID) indication information corresponding to the first terminal device and second ID indication information corresponding to the second terminal device; and generating, by the first terminal device, a first HARQ-ACK codebook based on the first ID indication information and/or the second ID indication information, wherein the first HARQ-ACK codebook comprises feedback bits for all HARQ processes that are sorted based on HARQ process numbers, and the first feedback bit has a position in the first HARQ-ACK codebook that is determined based on the first HARQ process number;

wherein the first SCI format further comprises first indication information indicating to generate the first HARQ-ACK codebook;

wherein when the first indication information indicates a first predetermined value, the first indication information indicates one-shot HARQ-ACK codebook feedback;

wherein the first ID indication information indicates a part of information in an ID of the first terminal device, and the first PSSCH comprises indication information indicating remaining information in the ID of the first terminal device; or the first ID indication information and indication information comprised in the first PSSCH jointly indicate the ID of the first terminal device; and the second ID indication information indicates a part of information in an ID of the second terminal device, and the first PSSCH comprises indication information indicating remaining information in the ID of the second terminal device; or the second ID indication information and indication information comprised in the first PSSCH jointly indicate the ID of the second terminal device;

wherein the first SCI format further comprises second indication information, and the second indication information indicates information on transmission of the first HARQ-ACK codebook; wherein the information on transmission of the first HARQ-ACK codebook comprises: a Transmission Power Control (TPC) command corresponding to the transmission of the first HARQ-ACK codebook.

2. The method according to claim 1, wherein the first SCI format further comprises indication information on the first HARQ process number.

3. The method according to claim 1, wherein said generating, by the first terminal device, the first HARQ-ACK codebook based on the first ID indication information and/or the second ID indication information comprises:

generating, by the first terminal device, the first HARQ-ACK codebook based on the same first ID indication information and the same second ID indication information.

4. The method according to claim 1, wherein the first HARQ-ACK codebook corresponds to a first Physical Sidelink Feedback Channel (PSFCH) format, and a maximum number of information bits for feedback information that the first PSFCH format is capable of carrying is greater than 2.

5. A Hybrid Automatic Repeat reQuest Acknowledgement (HARQ-ACK) codebook feedback method, comprising:

transmitting, by a second terminal device, a first Sidelink Control Information (SCI) format to a first terminal device, the first SCI format indicating to receive a first Physical Sidelink Shared Channel (PSSCH) based on a first HARQ process number, the first PSSCH corresponding to a first feedback bit, and the first SCI format comprising first identification (ID) indication information corresponding to the first terminal device and second ID indication information corresponding to the second terminal device; and receiving, by the second terminal device, a first HARQ-ACK codebook transmitted by the first terminal device, wherein the first HARQ-ACK codebook is generated by the first terminal device based on the first ID indication information and/or the second ID indication information, the first HARQ-ACK codebook comprises feedback bits for all HARQ processes that are sorted based on HARQ process numbers, and the first feedback bit has a position in the first HARQ-ACK codebook that is determined based on the first HARQ process number;

wherein the first SCI format further comprises first indication information indicating to generate the first HARQ-ACK codebook;

wherein when the first indication information indicates a first predetermined value, the first indication information indicates one-shot HARQ-ACK codebook feedback;

wherein the first ID indication information indicates a part of information in an ID of the first terminal device, and the first PSSCH comprises indication information indicating remaining information in the ID of the first terminal device; or the first ID indication information and indication information comprised in the first PSSCH jointly indicate the ID of the first terminal device; and the second ID indication information indicates a part of information in an ID of the second terminal device, and the first PSSCH comprises indication information indicating remaining information in the ID of the second terminal device; or the second ID indication information and indication information comprised in the first PSSCH jointly indicate the ID of the second terminal device;

wherein the first SCI format further comprises second indication information, and the second indication information indicates information on transmission of the first HARQ-ACK codebook; wherein the information on transmission of the first HARQ-ACK codebook comprises: a Transmission Power Control (TPC) command corresponding to the transmission of the first HARQ-ACK codebook.

6. The method according to claim 5, wherein the first SCI format further comprises indication information on the first HARQ process number.

7. The method according to claim 5, wherein:

the first HARQ-ACK codebook is generated by the first terminal device based on the same first ID indication information and the same second ID indication information.

8. A terminal device, comprising a processor and a memory, wherein the memory has a computer program stored thereon, and the processor is configured to invoke and execute the computer program stored in the memory to:

receive a first Sidelink Control Information (SCI) format transmitted by a second terminal device, the first SCI format indicating to receive a first Physical Sidelink Shared Channel (PSSCH) based on a first HARQ process number, the first PSSCH corresponding to a first feedback bit, and the first SCI format comprising first identification (ID) indication information corresponding to a first terminal device and second ID indication information corresponding to the second terminal device; and generate a first HARQ-ACK codebook based on the first ID indication information and/or the second ID indication information, wherein the first HARQ-ACK codebook comprises feedback bits for all HARQ processes that are sorted based on HARQ process numbers, and the first feedback bit has a position in the first HARQ-ACK codebook that is determined based on the first HARQ process number;

wherein the first SCI format further comprises first indication information indicating to generate the first HARQ-ACK codebook;

wherein when the first indication information indicates a first predetermined value, the first indication information indicates one-shot HARQ-ACK codebook feedback;

wherein the first ID indication information indicates a part of information in an ID of the first terminal device, and the first PSSCH comprises indication information indicating remaining information in the ID of the first terminal device; or the first ID indication information and indication information comprised in the first PSSCH jointly indicate the ID of the first terminal device; and the second ID indication information indicates a part of information in an ID of the second terminal device, and the first PSSCH comprises indication information indicating remaining information in the ID of the second terminal device; or the second ID indication information and indication information comprised in the first PSSCH jointly indicate the ID of the second terminal device;

wherein the first SCI format further comprises second indication information, and the second indication information indicates information on transmission of the first HARQ-ACK codebook; wherein the information on transmission of the first HARQ-ACK codebook comprises: a Transmission Power Control (TPC) command corresponding to the transmission of the first HARQ-ACK codebook.

9. The terminal device according to claim 8, wherein the first SCI format further comprises indication information on the first HARQ process number.

10. The terminal device according to claim 8, wherein the processor is configured to invoke and execute the computer program stored in the memory to perform:

generating the first HARQ-ACK codebook based on the same second ID indication information.

11. A terminal device, comprising a processor and a memory, wherein the memory has a computer program stored thereon, and the processor is configured to invoke and execute the computer program stored in the memory to perform the method according to claim 5.

* * * * *